United States Patent [19]

Molski

[11] Patent Number: 4,806,060

[45] Date of Patent: Feb. 21, 1989

[54] WHEEL CHAIR HOIST ASSEMBLY FOR VEHICLES

[76] Inventor: Bernard E. Molski, 5001 Coventry, Royal Oak, Mich. 48073

[21] Appl. No.: 56,382

[22] Filed: Jun. 1, 1987

[51] Int. Cl.[4] .................... B60P 1/54

[52] U.S. Cl. .................... 414/462; 15/246; 414/542; 414/921

[58] Field of Search .................... 15/246; 224/310, 311; 414/462, 542, 921

[56] References Cited

U.S. PATENT DOCUMENTS

| | | | |
|---|---|---|---|
| 1,614,769 | 1/1927 | Amsler . | |
| 1,703,153 | 2/1929 | Knoll | 104/91 |
| 2,191,912 | 2/1940 | Jardine et al. . | |
| 2,522,267 | 9/1950 | Hardin . | |
| 2,793,768 | 5/1957 | Schaedler . | |
| 2,835,285 | 5/1958 | Gardner . | |
| 3,656,637 | 4/1972 | Lynn et al. . | |
| 3,843,215 | 10/1974 | McCloskey | 308/6 R |
| 3,957,164 | 5/1976 | Brown . | |
| 4,076,347 | 2/1978 | Meek | 308/238 |
| 4,099,798 | 7/1978 | Steinmetz | 15/246 X |
| 4,281,958 | 8/1981 | Molski | 414/542 |
| 4,544,321 | 10/1985 | Lanier | 414/462 X |
| 4,565,482 | 1/1986 | Baker | 414/462 |

FOREIGN PATENT DOCUMENTS 1427838 3/1976 United Kingdom .

*Primary Examiner*—Robert J. Spar
*Assistant Examiner*—Janice Krizek
*Attorney, Agent, or Firm*—Cullen, Sloman, Cantor, Grauer, Scott & Rutherford

[57] ABSTRACT

A wheel chair hoist assembly for a vehicle having a body, a roof and a door opening comprises a support bar suspended within the body, with a mount tube reciprocally mounted upon the support bar. A boom having a retracted position within the body is located parallel to the support bar and at one end is secured to the mount tube. A motor operated winch assembly depends from the mount tube, and includes a drum with a cable wound thereon, and projected through the boom. The cable terminates in hooks to support a wheel chair. A reversible electric motor is supported upon the mount tube and drives a pinion in mesh with a stationary rack gear for reciprocally feeding the boom from its retracted position to an advanced position through the door opening. A manual remote control selectively connects the vehicle battery to the motor and to the winch assembly for alternately advancing and retracting the boom, and for alternately lowering and raising the wheel chair.

15 Claims, 3 Drawing Sheets

WHEEL CHAIR HOIST ASSEMBLY FOR VEHICLES

FIELD OF THE INVENTION

The present invention relates to a wheel chair hoist assembly for vehicles, and more particularly to a remote controlled apparatus for supporting a collapsed wheel chair within a vehicle, for moving the wheel chair to an exterior position outside of the vehicle and for selectively raising and lowering the collapsed wheel chair to and from the ground surface.

BACKGROUND OF THE INVENTION

Previously, it is known to provide for a vehicle a hoist assembly for lifting a wheel chair alone or with an occupant, and transporting the wheel chair, with or without an occupant into a vehicle, or for transporting an individual to and from a vehicle. The most pertinent prior art patent is believed to be Applicant's U.S. Pat. No. 4,281,958 dated Aug. 4, 1981, entitled "Wheel Chair Hoist Assembly for Vehicles."

SUMMARY OF THE INVENTION

An important feature of the present invention is to provide a wheel chair hoist assembly for a vehicle which represents an improvement over the construction shown in Applicant's prior U.S. Pat. No. 4,281,958.

Another feature is to provide a wheel chair hoist assembly adapted for mounting upon the interior of a vehicle having a roof, a body with a door opening on the driver's side, and a battery, which includes a transverse support bar adjacent to the door opening and suspended from the vehicle roof and supporting a mount tube slidable thereon. A reversible motor operated winch assembly is connected to the battery, depends from the mount tube, and includes a rotatable drum. A boom is mounted parallel to and spaced from the support bar and at one end is secured to the mount tube and extends longitudinally thereof. A cable is wound around a drum and guidably projects through the boom and depends therefrom and on its free end mounts a hook assembly to supportably engage a wheel chair. Power means are provided for effecting reciprocal longitudinal movements of the mount tube upon the support bar so that the mount tube may be advanced from a retracted position to a position through the door opening.

Still another feature is to provide a reversible electric motor connected to a battery, supported upon the mount tube and driving a pinion in mesh with a stationary rack gear within the body by which under remote control the mount tube may slide along the support bar for moving a suspended collapsed wheel chair from the interior of the vehicle to the exterior thereof and for successively energizing the winch assembly for lowering the wheel chair to the ground surface.

A further feature is to provide adjustable supports for the transverse support bar for the mount tube to accommodate the support bar to fit different widths of vehicles.

A still further feature is to provide an adjustable support for the rack gear upon the support bar to regulate the spacing of the rack gear relative to the support bar.

Another feature of the present invention is to provide a reversible motor operated winch assembly mounting a rotatable drum with a cable wound upon the drum and directed through a boom and depending therefrom with a hook on the end of the cable for supporting a wheel chair, together with an electric motor supported upon the mount tube for driving a pinion gear in mesh with a stationary rack gear for reciprocal movements of the mount tube along the support bar for moving the boom and the wheel chair from a position within the vehicle to an exterior position through the door opening adapted for lowering to the ground surface.

Still another feature is to provide a remote control for the reversible motor operated winch assembly and for the electric motor for the pinion gear such that selectively either motor may be energized for operation in one direction or in the reverse direction with suitable connections to a vehicle battery, providing electrical power to the respective motors.

Another feature is to provide upon the lift cable an improved hook means adapted for support and interlock with a pair of collapsed arms of a wheel chair to prevent accidental disassembly thereof.

Still another feature is to provide guide means in the form of an idler roller carried by the mount tube and guidably movable along the undersurface of the rack gear together with and overlying a wiper block of a plastic material which cooperatively rides over the corresponding top surface of the rack gear serving a stabilizing function during feed movements of the pinion along the length of the rack gear.

A further feature is to provide for the motor operated winch assembly an electric DC reversible motor under remote control and including a power take off transmission for controlled rotation of the drum and a cable wound thereon, and in conjunction with an electric DC motor with a power take off transmission driving a pinion in operative mesh with the rack gear for controlled rotary movements upon and along the rack gear for effecting selective reciprocal movements of the mount tube along the length of the support bar with corresponding movements of the boom and the suspended wheel chair.

These and other objects and features will be seen from the following specification and claims in conjunction with the appended drawings.

THE DRAWINGS

It will be understood that the above drawings illustrate a preferred embodiment of the invention, and that other embodiments are contemplated within the scope of the claims hereafter set forth.

DETAILED DESCRIPTION OF AN EMBODIMENT OF THE INVENTION

Figures 1, 6, 7:
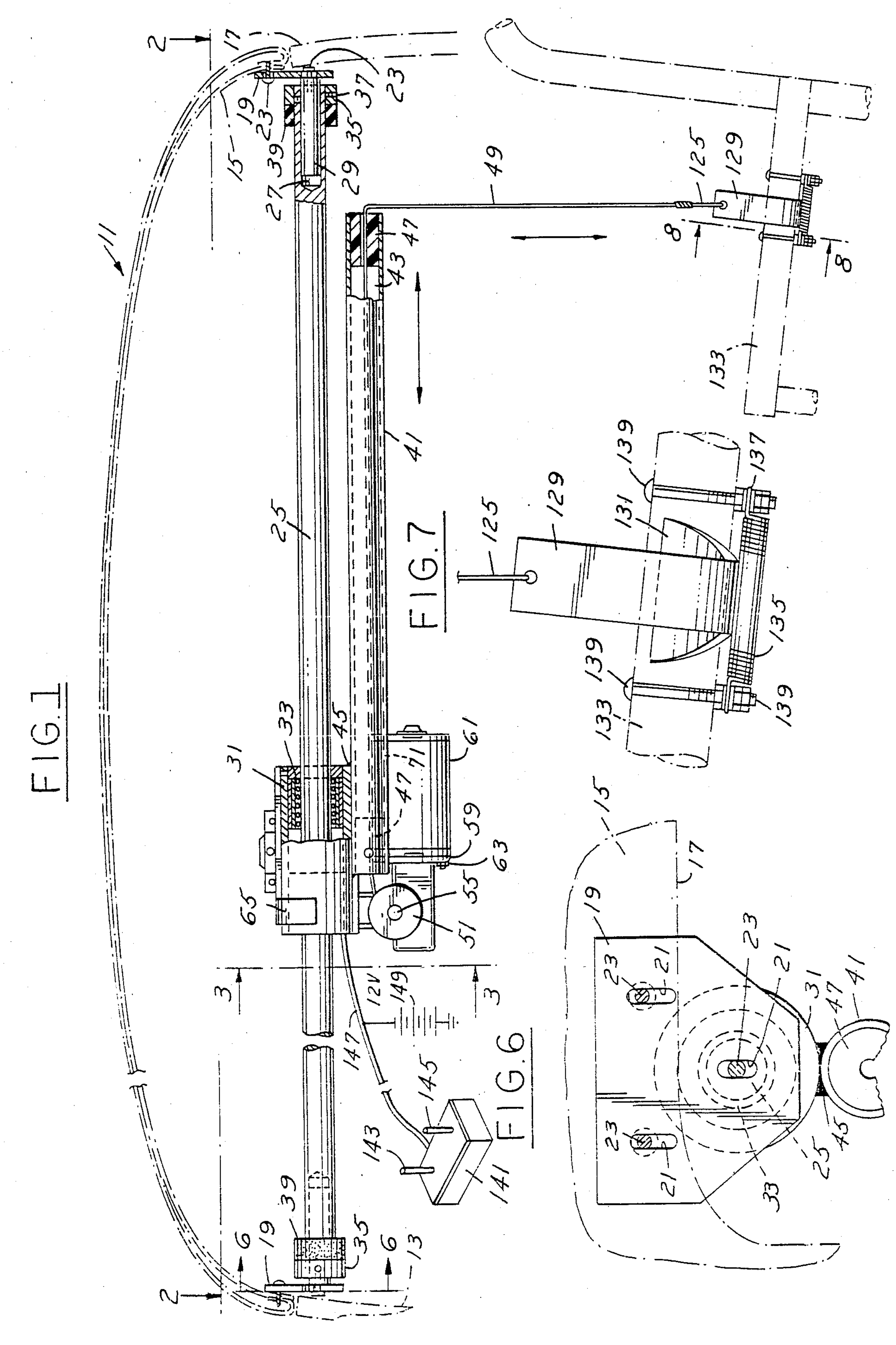
FIG. 1 is a fragmentary, broken away and partly sectioned front elevational view of the upper portion of a vehicle body and its roof, with the novel wheel chair hoist assembly suspended therefrom and with portions of the wheel chair shown in dash lines.
FIG. 6 is a fragmentary view, partly in section, taken in the direction of arrows 6—6 of FIG. 1, on an increased scale.
FIG. 7 is a fragmentary side elevational view of the hook assembly for the wheel chair shown in FIG. 1, on an increased scale.

The present wheel chair hoist assembly for vehicles is generally indicated at 11, FIG. 1, with a vehicle body fragmentarily shown at 13 having a roof 15 shown in dash lines and at least one door opening 17, such as the front door upon the driver's side of the vehicle. Laterally spaced opposed hanger brackets 19, FIGS. 1 and 6, include a pair of elongated slots 21 adapted to receive corresponding fasteners 23 for connection to the inside portion of vehicle roof 15, providing an adjustable suspension for the mount brackets 19.

Elongated support bar 25 is arranged transversely of the vehicle body 13 upon its interior and is adjacent to a rear portion of door opening 17. The bar 25 has upon opposite ends axial sockets 27 receiving plugs 29 whose ends engage the respective hanger brackets 19 and are secured thereto by axial fasteners 23. Mount tube 31, which has a retracted position in FIG. 1, is mounted upon elongated support bar 25 and includes within its interior a pair of longitudinally spaced ball bushings 33 which are in cooperative sliding engagement with the support bar 25.

Stop collars 35 are adjustably mounted upon end portions of the support bar 25 and are secured thereto by set screws 37. Corresponding rubber cushion bumpers 39 are snugly positioned over end portions of the support bar 25 and are in engagement with the stop collars 35.

The elongated tubular boom 41, FIG. 1, has a longitudinal bore 43 and is secured as by welds 45 to an undersurface portion of mount tube 31 at its one end. Boom 41 is mounted below and is parallel to the support bar 25. The opposite end of boom 41 is located upon the interior of the vehicle adjacent an end portion of support bar 25 when the boom 41 is in the retracted position shown. The boom has an advanced position longitudinally outward through door opening 17.

Apertured nylon bushings 47 are positioned and secured within opposite ends of boom 41 and are adapted to guidably receive cable 49 which at one end is secured to and wound around the winch drum 51. The drum 51 has an apertured axial hub 53, FIG. 3, secured over drive shaft 55 of differential transmission 57. Transmission 57 at one end has a mount plate 59 in registry with one end of electric reversible DC motor 61 and is secured thereto by a plurality of fasteners 63.

Figures 2, 4:
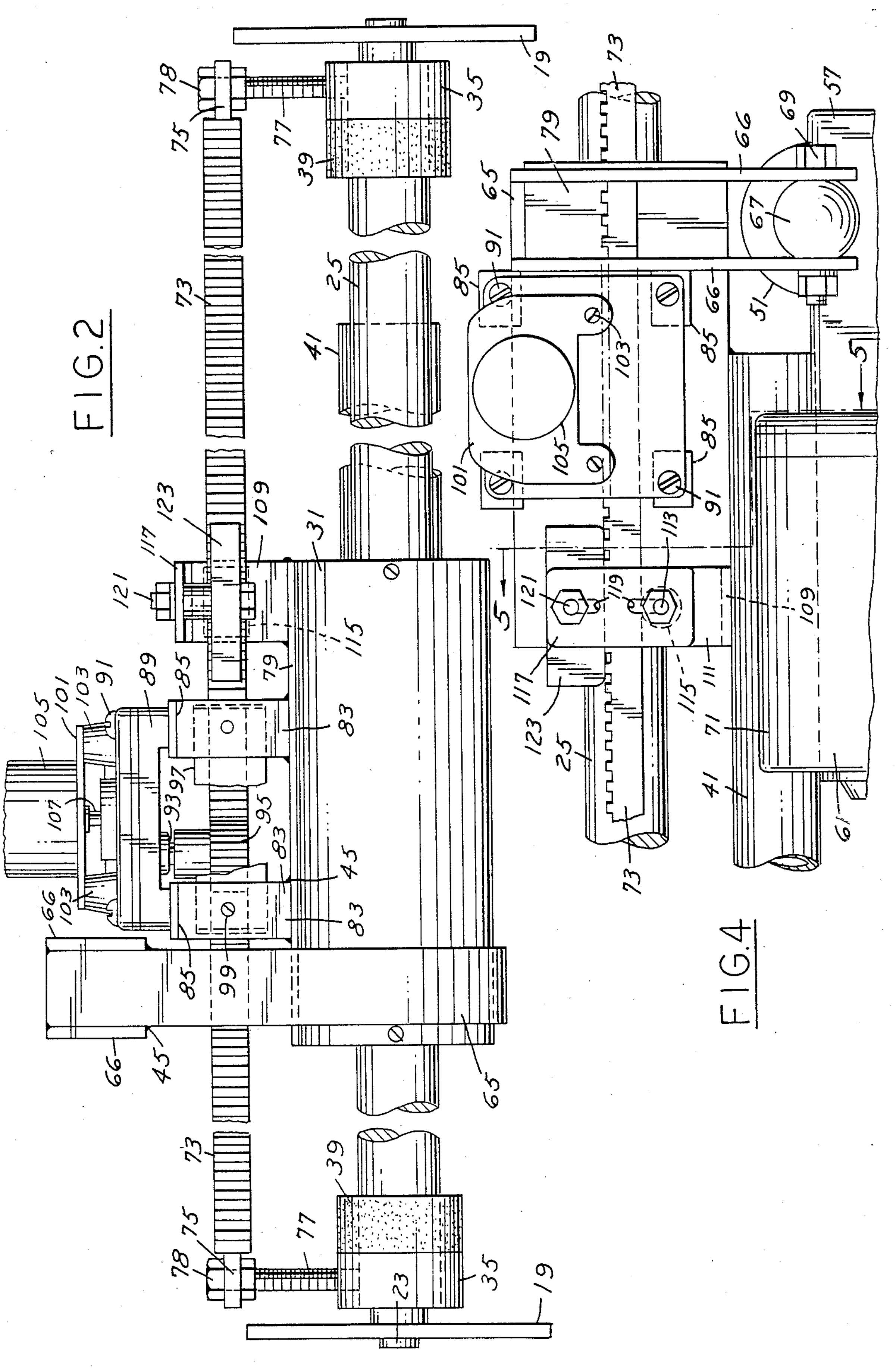
FIG. 2 is a fragmentary plan view of the wheel chair hoist assembly taken in the direction of arrows 2—2 of FIG. 1, on an increased scale.
FIG. 4 is a fragmentary elevational view taken in the direction of arrows 4—4 of FIG. 3.

The motor 61, in FIGS. 1 and 4, has an axial drive shaft 62 (FIG. 5) which extends into and is connected to the input of differential transmission 57 for effecting controlled rotation of drum 51 and the selective winding and unwinding of cable 49 thereof.

Figure 3:
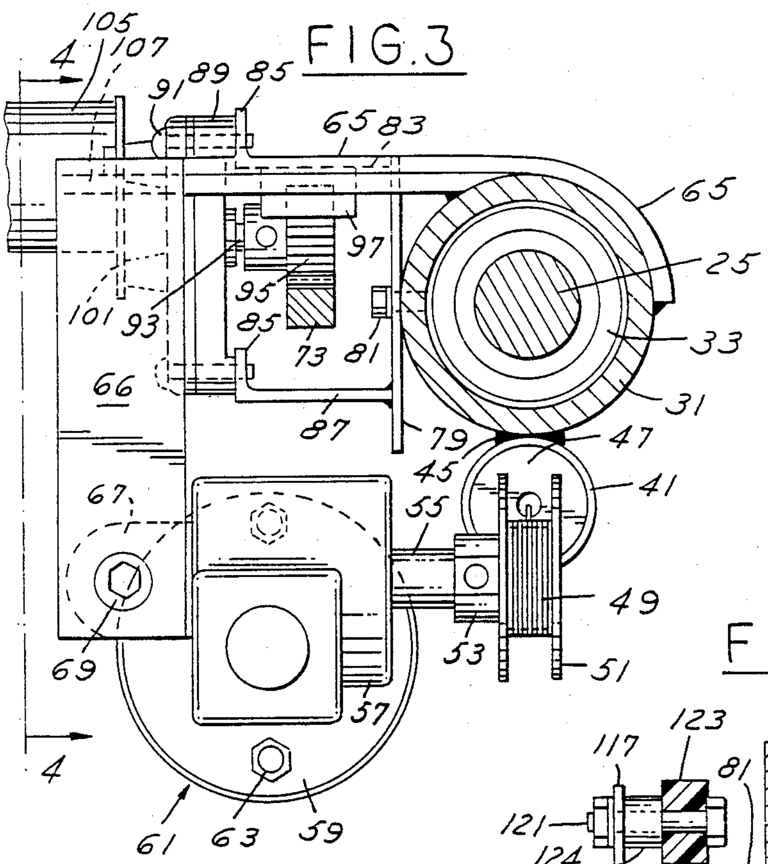
FIG. 3 is a fragmentary elevational view, partly in section, taken in the direction of arrows 3—3 of FIG. 1, on an increased scale.

The transverse bracket strap 65, FIGS. 1, 2 and 3, extends around an upper portion of mount tube 31 and laterally thereof, FIG. 4, and at its outer end supports the pair of upright mount plates 66 which depend therefrom. Mount boss 67 forming a part of winch transmission 57 is interposed between end portions of mount plates 66 and secured thereto by transverse fastener 69, FIGS. 3 and 4. Elongated motor support plate 71 extends from an upper portion of motor 61, bears against retractible boom 41 and is suitably secured thereto as by welding or fasteners.

Elongated rack gear 73 is spaced from and is located parallel to support bar 25 and at its ends is adjustably secured thereto, FIG. 2. Apertured mount flanges 75 extend from opposite ends of rack gear 73 and receive the transverse fasteners 77. The fasteners 77 extend into and are secured to corresponding stop collars 35. The corresponding nuts 78 upon fastener 77 provide a means by which the spacing of rack gear 73 may be adjusted with respect to support bar 25.

As shown in FIGS. 2, 3, 4 and 5 elongated upright mount plate 79 is mounted upon one side of mount tube 31 and secured thereto by fasteners 81. A pair of longitudinally spaced transverse top brackets 83 are suitably secured to mount plate 79 as by welds 45 and terminate in upright apertured mount flanges 85. A corresponding pair of longitudinally spaced bottom brackets 87 underlie top brackets 83 and are secured to mount plate 79 by welds 45 and terminate in the upright apertured mount flanges 85.

The differential speed reducer 89 bears against the respective mount flanges 85 and is secured thereto by a plurality of fasteners 91. The speed reducer 89 includes drive shaft 93 mounting pinion gear 95 in operative mesh with rack gear 73, FIGS. 2 and 3. The elongated gear cover 97 underlies the corresponding top brackets 83 and is secured thereto by fasteners 99 to protectively enclose top portions of power rotated pinion 95.

As shown in FIGS. 2, 3 and 4, upright motor mount plate 101 is secured as at 103 to the differential or speed reducer 89 and mounts motor 105, fragmentarily shown, being an electric reversible motor such as a 12 volt DC motor. The motor 105 has an output shaft 107 which is connected to a corresponding input of differential 89 providing a drive for shaft 93 and pinion gear 95.

Figure 5:
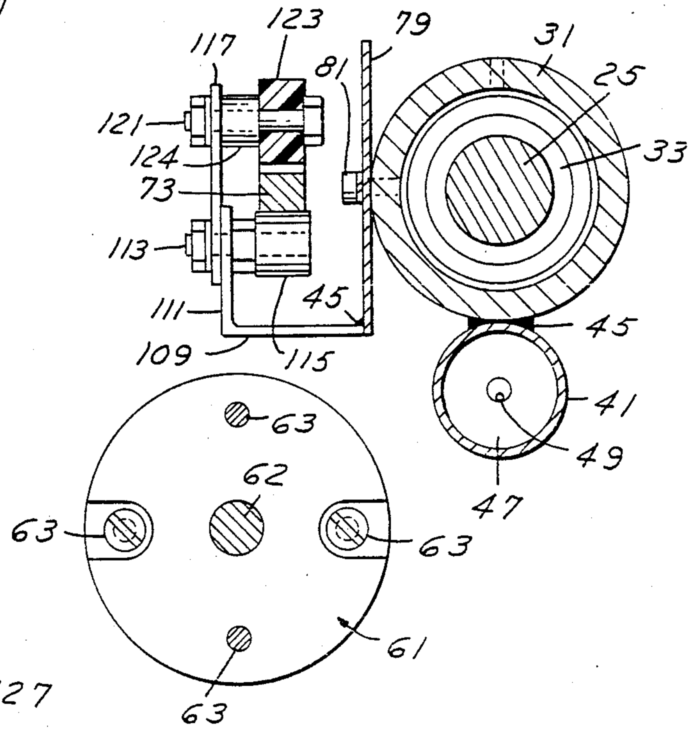
FIG. 5 is a sectional view taken in the direction of arrows 5—5 of FIG. 4.

Bracket arm 109, FIGS. 2, 4 and 5, secured to a lower portion of mount plate 79 as by the welds 45, FIG. 5, terminates in the upright apertured mount flange 111 upon which is adjustably mounted stud shaft 113 upon which is journaled cam roller 115. The cam roller 115 is in operative engagement with undersurface portions of rack gear 73 and is adapted to move along the length thereof during corresponding movements of mount tube 31 along support bar 25. Corresponding upright connector plate 117, slotted as at 119, FIG. 4 provides an adjustable mounting for shaft 113 and for the secondary transverse shaft 121 which mounts the elongated rack wiper block 123. The block is of a plastic material, as for example Nylon. A suitable spacer 124 is mounted upon shaft 121 and interposed between connector plate 117 and wiper block 123. By this construction reciprocal movements of the mount tube 31 effects corresponding reciprocal movements of wiper block 123 over the top surface of rack gear 73.

Figure 8:
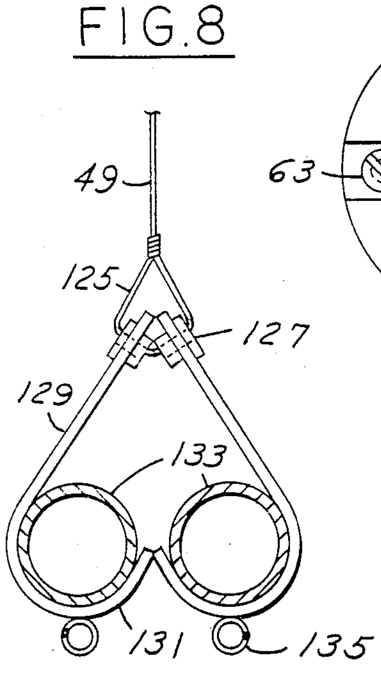
FIG. 8 is a sectional view taken in the direction of arrows 8—8 of FIG. 1, on an increased scale.

Cable 49, FIG. 1, depends from the free end of boom 41 and at its end has a loop portion 125 which extends through a pair of grommets 127 positioned within corresponding apertures upon the ends of wheel chair lift arms 129, FIGS. 7 and 8. The lift arms 129 extend angularly downward and outwardly and terminate in the opposed inwardly directed hooks 131 adapted for supporting engagement with undersurface portions of the adjacent collapsed arms 133 of a wheel chair. As shown in FIG. 7, hooks 131 are laterally elongated for an improved surface supporting engagement with undersurface portions of the wheel chair arms 133, fragmentarily shown.

Springs 135 provide a safety device against accidental separation of the hooks 131 from wheel chair arms 133, FIG. 7. There is provided upon each of the arms 133 lengthwise thereof an elongated coil spring 135 having anchoring eyes 137 at its opposite ends retained adjacent the undersurface of the corresponding arms 133 by transverse fasteners 139 which extend through the arms and are secured thereto. The hook portions 131 of lift arms 129 are yieldably retained upon the undersurface of the corresponding chair arms 133 between the arm and the adjacent coil spring 135.

A manually operable remote control box 141 is schematically shown in FIG. 1, normally placed upon the front seat of the vehicle for convenient use, which includes a pair of switch arms 143 and 145. In the illustrative embodiment the switch arm 143 has a central "off" position and is movable from the central position in one direction or the other and through appropriate electrical connections within cable 147 connects vehicle battery 149, schematically shown, with electric motor 105. This controls operating the electric motor in one direction or the other. Motor 105 controls rotation of pinion gear 95 controlling longitudinal movements of tube 31 along the length of support bar 25 between retracted and advanced positions.

The corresponding other switch arm 145 has a central "off" position and is moved to additional positions from the central position and through electrical leads through cable 147 connects vehicle battery 149 to motor 61. The motor 61 is a DC 12 volt motor corresponding to the 12 volt DC battery 149 conventionally used with vehicles. The collapsed wheel chair, shown in FIG. 1, is supported by its arms 133 upon the interior of the vehicle with the boom 41 retracted. Activation of switch arm 143 in one direction energizes motor 105 and drives pinion gear 95 along the length of rack gear 73 for advancing boom 41 to an advanced position out through the door opening 17. This correspondingly transfers the collapsed wheel chair outwardly of the vehicle.

At the end of the desired outward feed movement switch arm 143 is returned to its central "off" position and switch arm 145 is activated in the proper direction for energizing motor 61 such that drum 51 unwinds permitting cable 49 extending through the boom 41 to lower the collapsed wheel chair to the ground surface. At that time the lift arms 129 and corresponding hooks 131 are separated from arms 133 of the wheel chair. The wheel chair is opened and used in the conventional manner. Usually the unloaded boom is retracted by reversing motor 105. For the reverse when the wheel chair is returned to the vehicle by the user, it is necessary to again activate motor 105, advancing boom 41 outwardly of the door opening 17. Thereafter the lift arms 129 and hooks 131 are connected to collapsed arms 133 of the wheel chair. The secondary switch arm 145 is activated in the proper direction to energize motor 61 for winding drum 51 and cable 49 thereon lifting the chair arms 133 to a raised position corresponding to the proper heights. The switch 145 is returned to its "off" position and the outer switch 143 is activated in the opposite direction for activating motor 105 reversing the rotation of the rack gear 95 and causing inward feeding of mount tube 31, connected boom 41 and the collapsed wheel chair to the retracted position shown and with the wheel chair fully upon the interior of the vehicle for transport.

The present wheel chair hoist assembly 11 is easily installed within a vehicle overhead without restricting the rear seat area. It efficiently lifts and folds the wheel chair and then glides the wheel chair into the vehicle. The wheel chair stores conveniently behind the front seat.

The present wheel chair hoist assembly 11 is further adapted to glide the wheel chair out of the vehicle and lower it to the ground level. There is incorporated into the present wheel chair hoist assembly a simple electronic operation under the control of box 141 and switch arms 143 and 145 for the remote and automatic control of corresponding motors 105 and 61. The conventional vehicle battery 149 is employed for the operation of the respective motors.

The user of the wheel chair using the remote control box can sit on the front seat with his or her feet on the ground surface and operate the switch arm controls elevating the wheel chair and gliding it into the vehicle and then can return to a sitting position and drive off. Similarly at a particular destination the driver and user can open the door, turn 90° with his or her feet resting upon the ground surface and operate the remote controls in such a manner that the collapsed wheel chair is advanced outwardly of the door opening and successively lowered to the ground for opening and use in a conventional manner.

Having described my invention, reference should now be had to the following claims.

I claim:

1. A wheel chair hoist assembly adapted for mounting upon the interior of a vehicle having a roof, a body with a door opening upon the driver's side and a battery comprising:

spaced hanger brackets secured to and depending from the roof within and upon opposite sides of the body;

a transverse support bar adjacent the door opening and at its ends connected to said brackets;

a mount tube slidably mounted upon said support bar;

a winch mount bracket secured to and depending from said mount tube;

a tubular boom parallel to and spaced from said support bar and at one end secured to said mount tube, with its other end extending longitudinally of said mount tube, said boom being normally retracted within the body;

said boom being slidable along said support bar to an advanced position for projecting said other end of said boom laterally outward through said door opening;

a reversible motor operated winch assembly adapted to be connected to the battery and secured upon said winch mount bracket and including a rotatable drum;

a cable at one end secured to and mounted around said drum, guidably projected through said boom with its free end depending therefrom;

hook means mounted upon the other end of said cable adapted to supportably engage the collapsed arms of a wheel chair;

a rack gear spaced laterally of, parallel to and at its ends adjustably secured to said support bar;

a motor mount bracket secured to and extending laterally of said mount tube;

a reversible electric motor adapted to be connected to the battery, mounted upon said motor mount bracket and having a drive shaft;

a pinion gear connected to said drive shaft in mesh with said rack gear, whereby energizing the motor driving said pinion along said rack gear effects corresponding movements of said mount tube for moving said boom from a retracted position to an advanced position, and energizing of said winch assembly successively winds and unwinds said drum for alternately raising and lowering a wheel chair;

the mounting of said rack gear including a stop collar secured upon the ends of said support bar;

the opposite ends of said rack gear including apertured mount flanges; and fasteners extending through said mount flanges and secured respectively to said stop collars.

2. In the wheel chair hoist assembly of claim 1, said hook means including a pair of opposed engaging apertured lift arms receiving and connected to said cable;

said arms extending downwardly and outwardly terminating in opposed hooks engagable with the wheel chair arms.

3. In the wheel chair hoist assembly of claim 2, said hooks being laterally elongated.

4. In the wheel chair hoist assembly of claim 2, and a flexible coil spring underlying each chair arm, at its ends secured to said chair arm and yieldingly engagable with said hooks to prevent accidental disassembly thereof.

5. In the wheel chair hoist assembly of claim 1, and a manually operable control switch means adapted to selectively interconnect the battery with said motor operated winch assembly and with said electric motor, for successively advancing and retracting said boom and for successively raising and lowering the wheel chair, so that the wheel chair can be raised and retracted into the vehicle body and alternately projected out of the vehicle body and lowered to the ground by remote control.

6. In the wheel chair hoist assembly of claim 1, the connection of said pinion gear to said motor drive shaft, including a speed reduction transmission mounted upon said motor mount bracket having an input connected to said motor drive shaft and an output connected to said pinion gear.

7. In the wheel chair hoist assembly of claim 1, said motor mount bracket including an upright mount plate secured upon and along one side of said mount tube parallel to said rack gear;

spaced mount bracket arms secured to and extending laterally of said mount plate;

a speed reduction transmission secured to said bracket arms and having a drive shaft receiving said pinion gear and an input;

said motor mount bracket being connected to said transmission and said motor drive shaft being connected to said transmission input.

8. In the wheel chair hoist assembly of claim 1, and a reversible electric motor underlying and secured to said boom and connected to said winch assembly and having a drive shaft axially connected to said winch assembly.

9. In the wheel chair hoist assembly of claim 1, said winch assembly including a reversible electric motor underlying and secured to said boom and having a drive shaft; and a differential transmission axially connected to said motor and having an input connected to said motor drive shaft and having an output shaft;

said drum being mounted upon said transmission output shaft.

10. In the wheel chair hoist assembly of claim 1, and a pair of spaced ball bushings nested and retained within said mount tube guidably receiving said support bar.

11. In the wheel chair hoist assembly of claim 1, said mount flanges being selectively adjustable along said fasteners for modifying the space between said support bar and rack gear.

12. A wheel chair hoist assembly adapted for mounting upon the interior of a vehicle having a roof, a body with a door opening upon the driver's side and a battery comprising:

spaced hanger brackets secured to and depending from the roof within and upon opposite sides of the body;

a transverse support bar adjacent the door opening and at its ends connected to said brackets;

a mount tube slidably mounted upon said support bar;

a winch mount bracket secured to and depending from said mount tube;

a tubular boom parallel to and spaced from said support bar and at one end secured to said mount tube, with its other end extending longitudinally of said mount tube, said boom being normally retracted within the body;

said boom being slidable along said support bar to an advanced position for projecting said other end of said boom laterally outward through said door opening;

a reversible motor operated winch assembly adapted to be connected to the battery and secured upon said winch mount bracket and including a rotatable drum;

a cable at one end secured to and mounted around said drum, guidably projected through said boom, with its free end depending therefrom;

hook means mounted upon the other end of said cable adapted to supportably engage the collapsed arms of a wheel chair;

a rack gear spaced laterally of, parallel to and at its ends adjustably secured to said support bar;

a motor mount bracket secured to and extending laterally of said mount tube;

a reversible electric mount adapted to be connected to the battery, mounted upon said motor mount bracket and having a drive shaft;

a pinion gear connected to said drive shaft in mesh with said rack gear, whereby energizing the motor driving said pinion along said rack gear effects corresponding movements of said mount tube for moving said boom from a retracted position to an advanced position, and energizing of said winch assembly successively winds and unwinds said drum for alternately raising and lowering a wheel chair;

an upright mount plate secured upon and along one side of said mount tube parallel to said rack gear;

a bracket arm secured to said mount plate; and a cam roller journaled upon said bracket arm underlying and engageable with and movable along the undersurface of said rack gear along its length.

13. In the wheel chair hoist assembly of claim 12, and a rack gear wiper block opposed to said cam roller, constructed of a plastic material extending along the length of and engaging said rack gear and adjustably secured to said bracket arm.

14. In the wheel chair hoist assembly of claim 13, said wiper block being of a Nylon material.

15. A wheel chair hoist assembly adapted for mounting upon the interior of a vehicle having a roof, a body with a door opening upon the driver's side and a battery comprising:

spaced hanger brackets secured to and depending from the roof within and upon opposite sides of the body;

a transverse support bar adjacent the door opening and at its ends connected to said brackets;

a mount tube slidably mounted upon said support bar;

a winch mount bracket secured to and depending from said mount tube;

a tubular boom parallel to and spaced from said support bar and at one end secured to said mount tube, with its other end extending longitudinally of said mount tube, said boom being normally retracted within the body;

said boom being slidably along said support bar to an advanced position for projecting said other end of said boom laterally outward through said door opening;

a reversible motor operated winch assembly adapted to be connected to the battery and secured upon said winch mount bracket and including a rotatable drum;

a cable at one end secured to and mounted around said drum, guidably projected through said boom, with its free end depending therefrom;

hook means mounted upon the other end of said cable adapted to supportably engage the collapsed arms of a wheel chair;

a rack gear space laterally of, parallel to and at its ends adjustably secured to said support bar;

a motor mount bracket secured to and extending laterally of said mount tube;

a reversible electric motor adapted to be connected to the battery, mounted upon said motor mount bracket and having a drive shaft;

a pinion gear connected to said drive shaft in mesh with said rack gear, whereby energizing the motor driving said pinion along said rack gear effects corresponding movements of said mount tube for moving said boom from a retracted position to an advanced position, and energizing of said winch assembly successively winds and unwinds said drum for alternately raising and lowering a wheel chair;

the connection of said support bar to said brackets including axial sockets in the ends of said support bar;

a cylindrical plug adjustably positioned within each socket and extending outwardly of said support bar; and a fastener extending through each hanger bracket and axially into each plug, whereby said support bar will accommodate different vehicle widths.

* * * * *